(12) United States Patent
Hasenour

(10) Patent No.: US 9,795,086 B2
(45) Date of Patent: Oct. 24, 2017

(54) TWO-SIDED CLEANING ARRANGEMENTS FOR ENDLESS BELTS

(71) Applicant: DEERE & COMPANY, Moline, IL (US)

(72) Inventor: Anthony M. Hasenour, Port Byron, IL (US)

(73) Assignee: Deere & Company, Moline, IL (US)

(*) Notice: Subject to any disclaimer, the term of this patent is extended or adjusted under 35 U.S.C. 154(b) by 118 days.

(21) Appl. No.: 14/724,474

(22) Filed: May 28, 2015

(65) Prior Publication Data

US 2016/0345497 A1    Dec. 1, 2016

(51) Int. Cl.
| | | |
|---|---|---|
| B65G 45/10 | (2006.01) | |
| A01D 61/02 | (2006.01) | |
| A01D 41/14 | (2006.01) | |
| A01D 57/20 | (2006.01) | |
| A01D 61/00 | (2006.01) | |
| A01D 34/02 | (2006.01) | |

(52) U.S. Cl.
CPC ............. *A01D 61/02* (2013.01); *A01D 34/02* (2013.01); *A01D 41/14* (2013.01); *A01D 57/20* (2013.01); *A01D 61/002* (2013.01); *B65G 45/10* (2013.01)

(58) Field of Classification Search
CPC .. A01D 61/002; A01D 61/004; A01D 61/006; A01D 61/08; A01D 34/40; B65G 45/10; B65G 45/14
See application file for complete search history.

(56) References Cited

U.S. PATENT DOCUMENTS

| | | | | |
|---|---|---|---|---|
| 3,592,556 A | * | 7/1971 | Campbell | B65G 15/44 198/550.7 |
| 4,674,627 A | * | 6/1987 | Benlcio I. | B65G 15/42 198/821 |
| 5,350,020 A | | 9/1994 | Vandever et al. | |
| 5,456,067 A | | 10/1995 | Marler | |
| 8,186,136 B2 | | 5/2012 | Eick et al. | |
| 8,322,520 B2 | * | 12/2012 | Dow | A01D 61/002 198/837 |
| 8,341,929 B2 | * | 1/2013 | Sauerwein | A01D 41/14 56/181 |
| 2008/0202090 A1 | * | 8/2008 | Lovett | A01D 61/002 56/208 |
| 2011/0094201 A1 | * | 4/2011 | Bomleny | A01D 61/02 56/181 |
| 2015/0007544 A1 | | 1/2015 | Herringshaw et al. | |

FOREIGN PATENT DOCUMENTS

| | | | | |
|---|---|---|---|---|
| DE | EP 2502484 A1 | * | 9/2012 | ............. A01D 57/20 |
| EP | 2896283 A2 | | 7/2015 | |

OTHER PUBLICATIONS

European Search Report, Application No. 16169885.7-1656, Deere & Company, dated Oct. 31, 2016.

* cited by examiner

Primary Examiner — Mark A Deuble
(74) Attorney, Agent, or Firm — Lorenz & Kopf, LLP

(57) ABSTRACT

Two-sided cleaning arrangements for an endless belt for an agricultural header are disclosed. An endless belt with a two-sided cleaning arrangement may include a crop carrying surface and first and second cleaning features disposed in first and second edge regions, respectively, of the endless belt. The first and second cleaning features may extend above or be recessed below the crop-carrying surface.

20 Claims, 12 Drawing Sheets

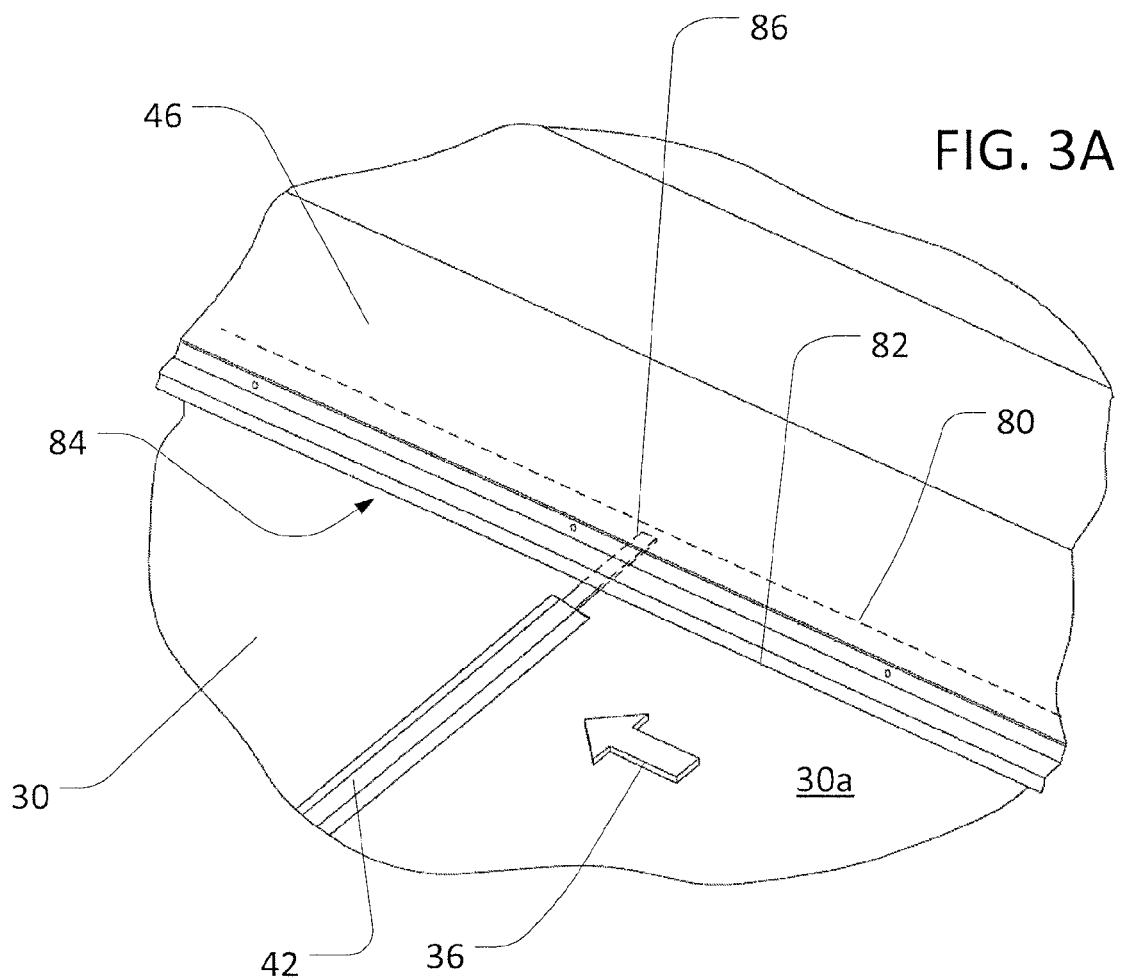
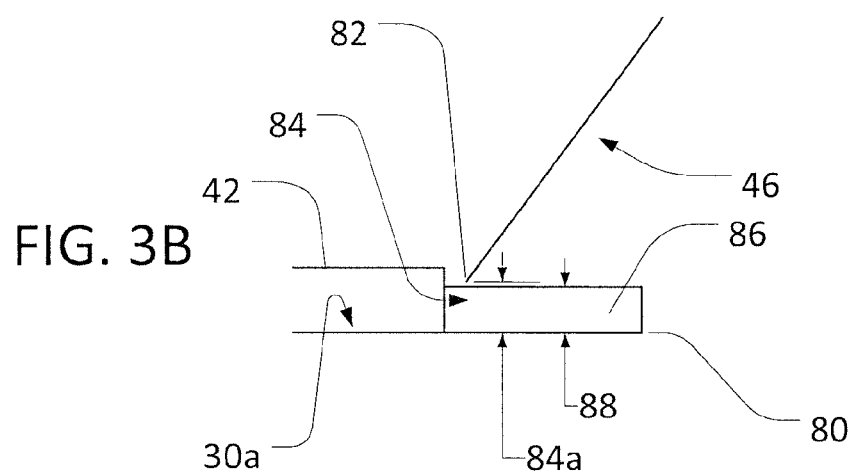

TWO-SIDED CLEANING ARRANGEMENTS FOR ENDLESS BELTS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to draper headers, and more particularly to cleaning arrangements for belts of draper headers.

BACKGROUND OF THE DISCLOSURE

Agricultural harvesters use a variety of implements attached to their front ends to gather crops. One type of these implements is called a "draper" or a "draper header". Conventional draper headers use conveyors with endless belts to carry cut crop material from leading-edge knives to center regions of the headers. From there, the cut crop material is conveyed into the harvesters. Once in the harvester, the cut crop material is further processed by separating grain from unwanted crop material (typically called "material other than grain" or "MOG").

In some configurations, crop material can become lodged in various spaces on and around the belts, resulting in sub-optimal performance of the header. For example, some headers include crop ramps that extend rearwardly (from a frame of reference of the relevant vehicle) from the knives over the leading edge of the headers' endless belts. These crop ramps help to lift the cut crop material onto the endless belts for transport along the header. However, crop material can become lodged in gaps between the crop ramps and the endless belts, to the detriment of header performance. Crop material can also become lodged in, and pass through, other gaps along the belts. In some cases, this can require machine stoppage in order to clear crop material from the headers' internal areas.

SUMMARY OF THE DISCLOSURE

A two-sided cleaning arrangement is disclosed for endless belts, such as endless belts of draper headers.

According to one aspect of the disclosure, an endless belt for a header with a crop ramp and a trailing cover may include a crop-carrying surface and first and second cleaning regions that are at least partly separated from each other by the crop-carrying surface. The cleaning regions may include respective cleaning features that extend above or are recessed below the crop-carrying surface, in order to clean crop material from below the crop ramp and the trailing cover, respectively.

According to another aspect of the disclosure, an endless belt for a header with a crop ramp and a trailing cover may include a crop-carrying surface extending at least partly between the crop ramp and the trailing cover. The endless belt may also include first and second cleaning regions at least partly separated from each other by the crop-carrying surface. The cleaning regions may include respective arrays of cleaning features with respective pluralities of alternating ridges and recesses.

According to yet another aspect of the disclosure, an endless belt may include first and second cleaning features disposed in first and second edge regions, respectively, of the endless belt. At least part of each cleaning surface may extend above or be recessed below a crop-carrying surface of the belt.

The details of one or more implementations of the disclosure are set forth in the accompanying drawings and the description below. Other features and advantages will become apparent from the description, the drawings, and the claims.

BRIEF DESCRIPTION OF THE DRAWINGS

FIG. 3A is an enlarged perspective view of a trailing portion of the draper header of FIG. 1, including the trailing cover and a second cleaning feature of the endless belt;

FIG. 3B is a schematic sectional view of the trailing cover and part of the endless belt of FIG. 1, including the second cleaning feature;

Like reference numerals in the drawings indicate like components, parts, or operations.

DETAILED DESCRIPTION

Figure 1:
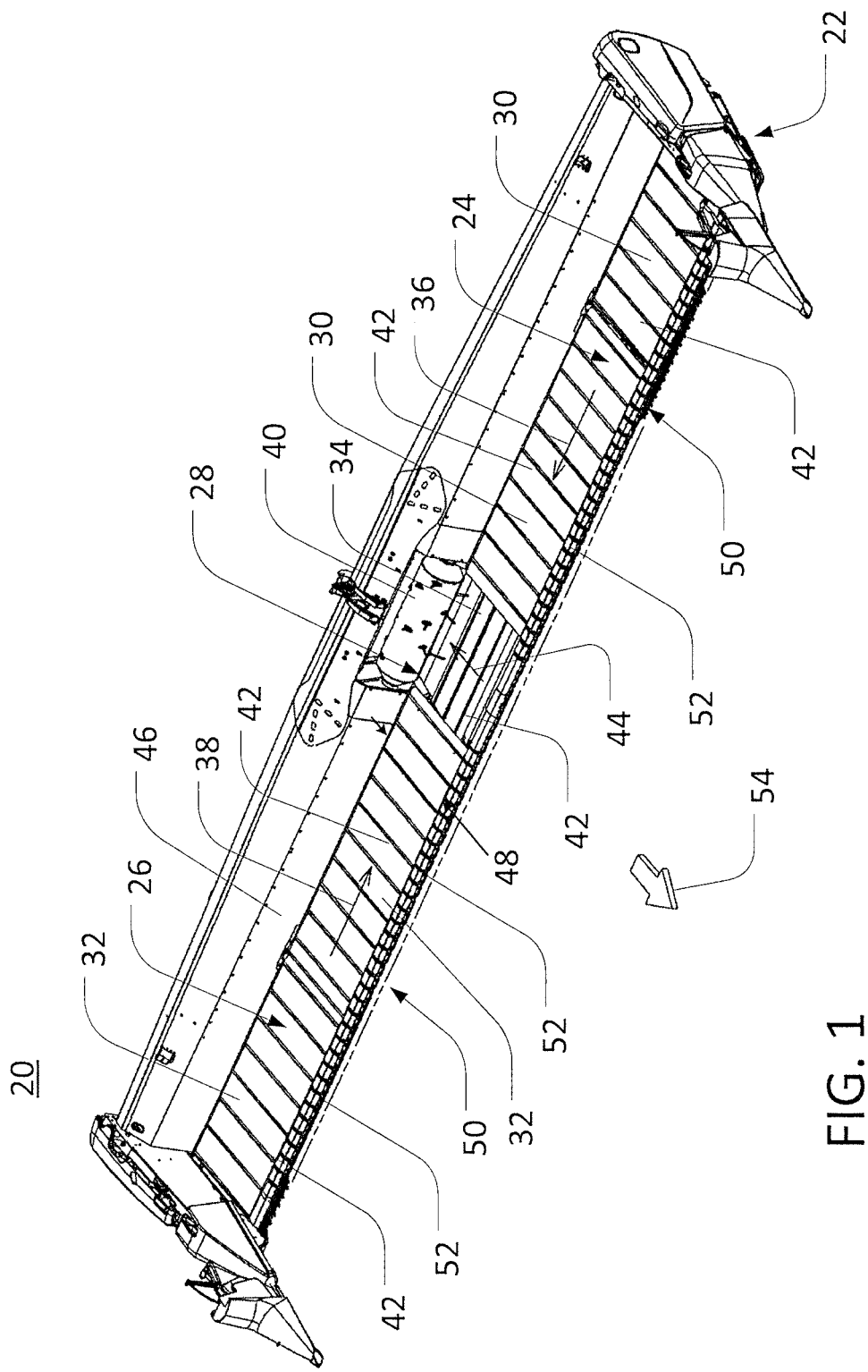
FIG. 1 is a perspective view of an agricultural draper header with a crop ramp, trailing cover, and endless belt.

The following describes one or more example embodiments of the disclosed cleaning arrangement, as shown in the accompanying figures of the drawings described briefly above.

As used herein, with respect to an endless belt, unless otherwise defined or limited, the term "forward" (and the like) corresponds to a forward direction of travel of the belt, with respect to a supporting frame (e.g., a frame of a draper header), during normal operation of the belt. Likewise, the term "rearward" (and the like) corresponds to a direction opposite the forward direction of travel of the belt. In this regard, for example, a "forward facing" feature on an endless belt may generally face in the direction that the belt travels during normal operation, while a "rearward facing" feature may generally face opposite that direction.

Also as used herein, with respect to a header (or components thereof), unless otherwise defined or limited, the term "leading" (and the like) indicates a direction of travel of the header during normal operation (e.g., the forward direction of travel of a harvester vehicle carrying the header). Similarly, the term "trailing" (and the like) indicates a direction that is opposite the leading direction. In this regard, for example, a "leading" edge of a knife assembly of a draper header may be generally disposed at the front of the knife assembly, with respect to the direction travel of the draper header during normal operation (e.g., as carried by a harvester vehicle). Likewise, a "trailing" edge of the knife assembly may be generally disposed at the back of the knife assembly, with respect to the direction of travel of the draper header during normal operation.

It will be understood that "leading" and "trailing" may not necessarily denote the extreme leading or trailing edge of a body. For example, a trailing cover on an agricultural header may trail behind certain features, such as a leading-edge knife or endless belt, but may not necessarily be at the trailing end of the entire header. Further, in some embodiments discussed herein, an endless belt may be configured to be reversed on a conveyor, such that a particular edge of the belt may be either a leading edge or a trailing edge, depending on the orientation of the belt. Accordingly, unless otherwise defined or limited, the terms "leading" and "trailing" may be used herein with respect to reversible endless belts (or features thereupon) to indicate a currently-addressed orientation of the belt (or feature), rather than an absolute orientation.

As noted above, operation of an endless belt for crop transport may result in crop material becoming lodged in or passing through various clearances, to the detriment of overall header performance. For example, during operation of an endless belt for a draper header, cut crop material may be pushed into, and generally lodged within, a clearance between crop ramps of the header and a leading portion of the endless belt. Similarly, crop material may be pushed into, and sometimes pass through, a clearance between a trailing cover (e.g., a back sheet deflector or rear frame cover) and a trailing portion of the endless belt. Each of these results may adversely affect performance of the endless belt and of the header as a whole. Among other benefits, the disclosed two-sided cleaning arrangement may address these issues.

Generally, a two-sided cleaning arrangement for an endless belt includes cleaning features on leading and trailing portions of an endless belt. In a belt for a draper header, for example, a leading portion of the belt near a crop ramp (or similar feature) may include a first set of cleaning features, and a trailing portion of the belt near a trailing cover (or similar feature) may include a second set of cleaning features. During operation, such a two-sided configuration may help to remove crop material from a gap between the belt and the crop ramp and from a gap between the belt and the trailing cover. Further, in some configurations, as cleaning features on the leading (or trailing) portion of a belt suffer from wear or other degradation, the orientation of the belt on the header may be reversed such that the previously trailing (or leading) portion of the belt is oriented as a leading (or trailing) portion of the belt for subsequent operation. Accordingly, the cleaning features on the previously trailing (or leading) portion of the belt may continue to provide cleaning functionality at a leading (or trailing) region, even after relatively significant wear to cleaning features at the other edge of the belt, and the useful life of the belt may be extended.

Cleaning features according to the present disclosure may exhibit (e.g., be formed in the shape of) a variety of patterns. In some embodiments, cleaning features may be formed as polygonal or other shapes that are raised away from, or recessed below, a cleaning surface of a belt. For example, cleaning features may be formed as rectangles, triangles, chevrons, and so on, which either extend above a cleaning surface of a belt, or are recessed below (i.e., extend below) the cleaning surface. In some embodiments, a cleaning feature may extend forward (i.e., along the direction of motion of the belt during normal operation) from a trailing end of the feature to a leading end of the feature (or vice versa). In some embodiments, varying geometries may be used, such that a cleaning feature may include portions configured as rectangles, portions configured as triangles, raised portions, recessed portions, and so on.

In some embodiments, cleaning features on a leading or trailing edge of belt may be arranged within a cleaning region that extends over a substantial portion of the circumferential length of the belt. In some embodiments, cleaning features may be arranged in various arrays within the cleaning region. For example, a cleaning feature such as a raised rectangle or triangle may be repeated (with or without geometric variation of the rectangle or triangle) in an array that extends along 25% or more (e.g., 50%) of a belt. In this way, cleaning functionality may be provided by the array of cleaning features at multiple points along the belt.

In some embodiments, an array of cleaning features may include different types of cleaning features, such as rectangular ridges and raised triangles. In some embodiments, an array of cleaning features may include alternating raised and recessed geometries. For example, in some cleaning feature arrays, raised cleaning features (i.e., cleaning features extending above a cleaning surface of a belt) such as raised rectangles or triangles may alternate with recessed cleaning features (i.e., cleaning features extending below the cleaning surface) along a belt. In some embodiments, such an array of cleaning features may be continuous along the entire circumferential length of the belt.

In some embodiments, one array of cleaning features at a leading or trailing edge of a belt may be separated from another array of cleaning features on the relevant edge by various distances. In some embodiments, cleaning feature arrays (or individual cleaning features) may be separated from each other by portions of a belt without cleaning features. For example, an array of alternating ridges and recesses on a cleaning belt may be separated from another array on the belt by one or more flattened regions on the belt. Such flattened regions may be flush with a crop-carrying surface of the belt, or may extend above or be recessed below the crop-carrying surface. This may allow for variations in cleaning effects along a circumferential length of a belt, and may also facilitate various manufacturing processes.

In some embodiments, a cleaning feature may be aligned with other features on a belt. For example, a cleaning feature at a leading or trailing edge of a belt may be generally aligned with a cleat extending over a central portion of the belt. In some embodiments, cleaning features at a leading edge of a belt may vary in pattern or in disposition (e.g., orientation or order) within an array from cleaning features at a trailing edge of the belt.

Various examples and discussion herein address endless belts for use with draper headers. It will be understood that this configuration is presented as an example only and that various other applications may be possible.

Referring now to FIG. 1, an example draper header 20 is depicted. In various embodiments, the disclosed cleaning arrangements may be used with the header 20, or with other headers, including other draper headers. As depicted, the header 20 includes a frame 22 that supports left- and right-side conveyors 24 and 26 and a center conveyor 28. ("Left" and "right," with respect to the header, are taken from the perspective of an operator of a trailing agricultural harvester (not shown) carrying the header.) Each of the conveyors 24, 26, and 28 is configured as a belt-type conveyor extending over a respective circumferential length, with motive devices such as motors, gears, internal belts, and so on (not shown) moving endless belts 30, 32, and 34 in respective loops along the header 20. As depicted, two belts 30 and two belts 32 are included on each side of the header 20. In other embodiments, other numbers of belts may be used. In some embodiments the belts 30, 32, and 34 may be formed from as elastomer-impregnated fabric belts, supported by two or more rollers (not shown). Generally, the belts 30 and 32 may be rotated such that upper surfaces of the belts 30 and 32 move inward along the header 20 in respective directions 36 and 38. In this way, material such as cut plant matter may be moved by the belts 30 and 32 to the center conveyor 28, which may in turn use the belt 34 move the material off of the header 20 and into an associated harvester vehicle (not shown). As depicted, for example, a cylindrical conveyor 40 may be configured receive cut crop material from the center conveyor 28 and carry the crop material rearward (i.e., in a direction 44) through an aperture in the frame 22 and into the harvester (not shown).

In the embodiment depicted, various cleats 42 are fixed to the surface of each of the endless belts 30, 32, and 34, with the cleats 42 generally extending in a direction transverse to the direction of travel of the respective belt 30, 32, or 34. In some embodiments, the cleat 42 may extend only partly across the respective width of the belts 30, 32, and 34, and may accordingly not extend to the leading edge or the trailing edge of the belts 30, 32, and 34. As depicted, the cleats 42 exhibit a generally trapezoidal cross-section, with curved lower vertices (see FIG. 2A). In other embodiments, other configurations of the cleats 42 may be possible.

To cut crop material from a field, the header 20 of FIG. 1 includes a reciprocating knife 50 that extends across substantially the entire length of the header 20. In various embodiments, the header 20 may also include a leading cover arranged between the reciprocating knife 50 and the various belts 30, 32, and 34, with the leading cover extending at least partly over a leading edge of at least the belts 30 and 32. As depicted in FIG. 1, for example, the header 20 includes an elongate row of interlocking crop ramp segments 52 (see also FIG. 2A), that extend along substantially the entire length of the header 20.

As depicted, the header 20 also includes a trailing cover 46 (e.g., a back sheet deflector or rear frame cover) separated from the crop ramp segments 52 by a width 48. The trailing cover 46 may serve to cover and protect various internal components of the header 20, and may also generally define a trailing end of a crop-carrying region of the header 20. In some embodiments, the cleats 42 may extend over the entire width 48. In other embodiments, the cleats 42 may extend over only a fraction of the width 48.

During a harvesting operation, the harvester vehicle (not shown) may carry the header 20 through an agricultural field in a nominal forward direction 54. As the header 20 is moved across the field, the reciprocating knife 50 may operate at the leading edge of the header 20 to sever the crops adjacent to the ground, and the cut crop material may fall in a trailing direction (i.e., generally opposite the direction 54), onto one or more of the three conveyors 24, 26, and 28. The left side conveyor 24 may then carry the crop material rightward, using the two belts 30, toward the center of the header 20. The right side conveyor 26 may carry the crop material leftward, using the two belts 32, toward the center of the header 20, and the center conveyor 28 may carry the crop material rearward toward and underneath the cylindrical conveyor 40. (As noted above, these crop movements may each be viewed as a "forward" movement, from the perspective of the respective belts 30, 32 or 34.) Crop material from the conveyor 40 is then moved in the trailing direction through the aperture in the frame 22 of the header 20 and thence into the agricultural harvester (not shown).

As depicted, the left-side conveyor 24 and the right-side conveyor 26 are similarly configured, although the conveyors 24 and 26 may carry crop material in opposite directions (i.e., for both of the conveyors 24 and 26, toward the center conveyor 28). In other embodiments, left- and right-side conveyors (or others) may be configured differently. Generally, however, description herein of the left-side conveyor 24 may be applicable to the right-side conveyor 26, as well as other conveyors of other embodiments.

Figure 2A:
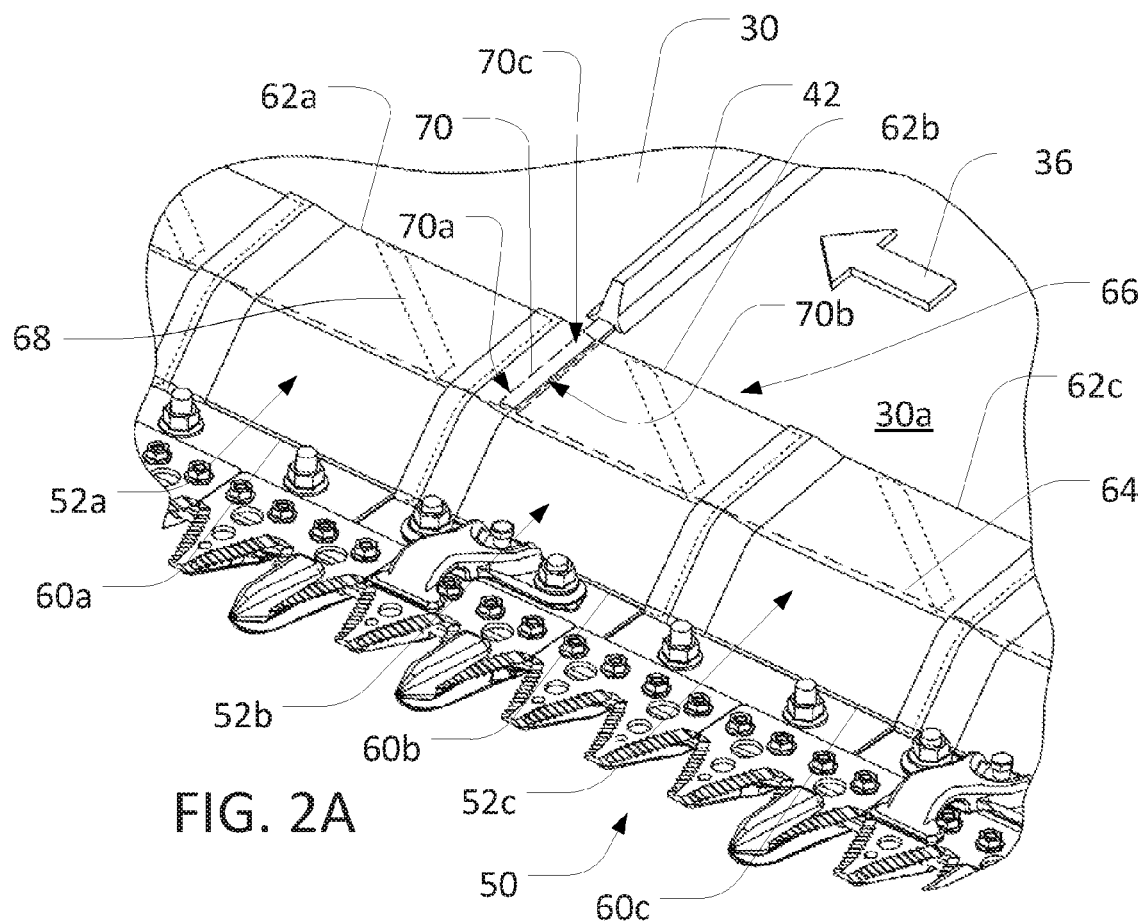
FIG. 2A is an enlarged perspective view of a leading portion of the draper header of FIG. 1, including the crop ramp and a first cleaning feature of the endless belt.
Figure 2B:
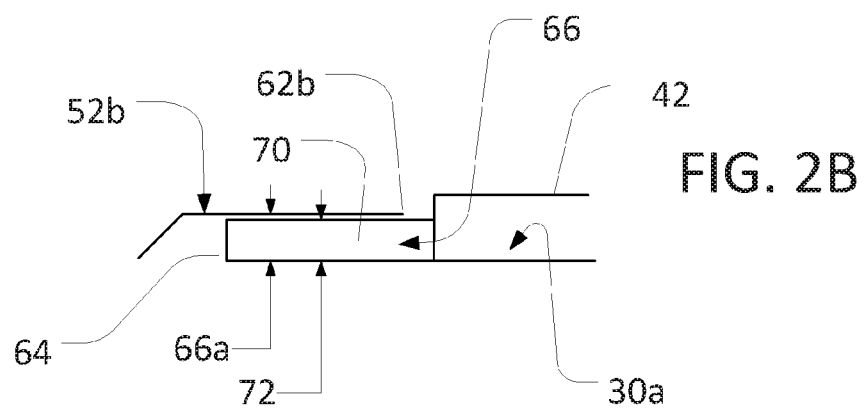
FIG. 2B is a schematic sectional view of the crop ramp and part of the endless belt, including the first cleaning feature.

During a harvesting operation using the header 20 (or other headers), crop material carried by the various belts (e.g., the belts 30 and 32) may tend to become lodged in recesses or pinch-points near the path of the belts. For example, as depicted in FIG. 2A for the left-side conveyor 24, the header 20 may include the crop ramp segments 52a through 52c, each generally disposed adjacent to and overlapping with neighboring instances of the segments 52. Each of the crop ramp segments 52 generally extends in the trailing direction from a corresponding leading edge 60 (e.g., leading edges 60a through 60c) to a corresponding trailing edge 62 (e.g., trailing edges 62a through 62c). Generally, the trailing edges 62 of the crop ramp segments 52 at least partly cover a leading edge of the relevant belt. As depicted, for example, the trailing edges 62a through 62c of the crop ramp segments 52a through 52c cover a leading edge 64 of the belt 30. As such, as depicted for the trailing edge 62b in FIG. 2B, each of the trailing edges 62 may generally define a gap 66 with a clearance 66a between the crop-carrying surface 30a of the belt 30 (or other crop-carrying surfaces of other belts) and the corresponding ramp segment 52.

Some embodiments of the crop ramp segments 52 may include features disposed within the gap 66. For example, in the embodiment depicted in FIG. 2A, elongate recesses 68 are formed on the underside of each of the crop ramp segments 52a through 52c. As depicted, the recesses 68 extend at an angle with respect to the belt 30, such that the recesses 68 extend forward, with respect to the direction 36 of belt travel, and in the trailing direction, with respect to the direction 54 of header travel, from the leading ends of the recesses 68 to the trailing ends of the recesses 68. In other embodiments, other configurations may be used, or other (or no) features may be included on the crop ramp segments 52 within the gap 66. Generally, the recesses 68 may assist in removing cut crop material from the gap 66, in a manner that is complimentary to the belt cleaning arrangements disclosed herein.

In the embodiment depicted in FIG. 2A, a leading-edge cleaning feature 70 is included on the belt 30 near the crop ramp segments 52. As depicted, the cleaning feature 70 is configured as a generally rectangular body extending (i.e., raised) above the crop-carrying surface 30a. In other embodiments, other geometries may be used. In some embodiments, the feature 70 may be integrally formed with the belt 30. In some embodiments, the feature 70 may be separately formed then securely bonded or otherwise attached to the belt 30.

As depicted, the feature 70 exhibits a maximum height 72 above the crop-carrying surface 30a that is somewhat less than the total clearance 66a between the ramp segment 52b and the crop-carrying surface 30a. Accordingly, as the belt 30 travels along the direction 36, the feature 70 may sweep crop material out of the gap 66 without substantially interfering with the ramp segment 52b. In some embodiments, the feature 70 (or another cleaning feature) may exhibit a maximum height that is substantially equal to the clearance 66a, such that the feature 70 directly contacts the underside of the ramp segment 52b. In some embodiments, the feature 70 (or another cleaning feature) may exhibit a maximum height that is larger than the clearance 66a, such that the feature 70 may bear on the ramp segment 52b and urge the ramp segment 52b upward during operation.

As depicted, the feature 70 includes a forward facing surface 70a that is generally perpendicular to the crop-carrying surface 30a, and that tends to engage cut crop material embedded within the gap 66 and carry that material along the direction 36. The feature 70 also includes a rearward facing surface 70b that is generally perpendicular to the crop-carrying surface 30a and generally parallel to the forward facing surface 70a. The feature 70 also includes a generally planar top surface 70c, which is generally parallel to the crop-carrying surface 30a of the belt 30 and has a generally constant width, as measured along the direction 36. In other embodiments, other configurations may be possible.

Also as depicted, the feature 70 generally extends from the leading edge 64 of the belt 30 to a leading end of the adjacent cleat 42, with which the feature 70 is aligned. Where, as in FIG. 2A, the cleat 42 does not extend over the entire width 48 (see FIG. 1), such a configuration of the feature 70 results in a portion of the feature 70 extending outside of the gap 66 onto the central region of the crop-carrying surface 30a of the belt 30. In some embodiments, the feature 70 may not extend outside of the gap 66, such that the entire feature 70 may be covered by one (or more) of the crop ramp segments 52. In some embodiments, the feature 70 may not extend into the gap 66, such that the entire feature 70 may be disposed outside of the gap 66. In some embodiments, the feature 70 (or other leading-edge cleaning features) may not be aligned with the cleat 42.

In a two-sided cleaning arrangement, another cleaning feature may be included at the trailing edge of the relevant belt, such as where a trailing cover generally covers at least part of belt. Referring also to FIGS. 3A and 3B, for example, the trailing cover 46 generally covers at least part of a trailing edge 80 of the belt 30. As such, a leading edge 82 of the cover 46 may generally define a gap 84 with a clearance 84a between the crop-carrying surface 30a of the belt 30 (or other crop-carrying surfaces of other belts) and the cover 46.

To provide a two-sided cleaning arrangement, a trailing-edge cleaning feature 86 is included on the belt 30 near the crop ramp segments 52. As depicted, the cleaning feature 86 is configured as a generally rectangular body extending (i.e., raised) above the crop-carrying surface 30a. In other embodiments, other geometries may be used. In some embodiments, the feature 86 may be integrally formed with the belt 30. In some embodiments, the feature 86 may be separately formed then securely bonded or otherwise attached to the belt 30.

As depicted, the feature 86 exhibits a maximum height 88 above the crop-carrying surface 30a that is somewhat less than the total clearance 84a between the leading edge 82 of the trailing cover 46 and the crop-carrying surface 30a. Accordingly, as the belt 30 travels along the direction 36, the feature 86 may sweep crop material out of the gap 84 without substantially interfering with the trailing cover 46. In some embodiments, the feature 86 (or another cleaning feature) may exhibit a maximum height that is substantially equal to the clearance 84a, such that the feature 86 directly contacts the underside of the trailing cover 46. In some embodiments, the feature 86 (or another cleaning feature) may exhibit a maximum height that is larger than the clearance 84a, such that the feature 86 may bear on the trailing cover 46 and urge the trailing cover 46 upward during operation.

As depicted, the feature 86 includes a forward facing surface 86a that is generally perpendicular to the crop-carrying surface 30a, and that tends to engage cut crop material embedded within the gap 66 and carry that material along the direction 36. The feature 86 also includes a rearward facing surface 86b that is generally perpendicular to the crop-carrying surface 30a and generally parallel to the forward facing surface 86a. The feature 86 also includes a generally planar top surface 86c, which is generally parallel to the crop-carrying surface 30a of the belt 30 and has a generally constant width, as measured along the direction 36. In other embodiments, other configurations may be possible.

Also as depicted, the feature 86 generally extends from the trailing edge 80 of the belt 30 to a trailing end of the adjacent cleat 42, with which the feature 86 is aligned. Where, as in FIG. 3A, the cleat 42 does not extend over the entire width 48 (see FIG. 1), such a configuration of the feature 86 results in a portion of the feature 86 extending outside of the gap 84 onto the central region of the crop-carrying surface 30a of the belt 30. In some embodiments, the feature 86 may not extend outside of the gap 84, such that the entire feature 86 may be covered by the trailing cover 46. In some embodiments, the feature 86 may not extend into the gap 84, such that the entire feature 86 may be disposed outside of the gap 84. In some embodiments, the feature 86 (or other trailing-edge cleaning features) may not be aligned with the cleat 42.

As depicted, the cleaning features 70 and 86 are configured with similar geometry, each exhibiting a generally uniform rectangular cross-section, generally uniform height, width (i.e., as measured along the forward/rearward directions of the belt 30), and length (i.e., as measured along the leading/trailing directions). In some embodiments, trailing-edge cleaning features for a belt may vary from leading-edge cleaning features, including with regard to overall shape, particular dimensions, distribution and orientation on the relevant belt, and so on.

Figure 4:
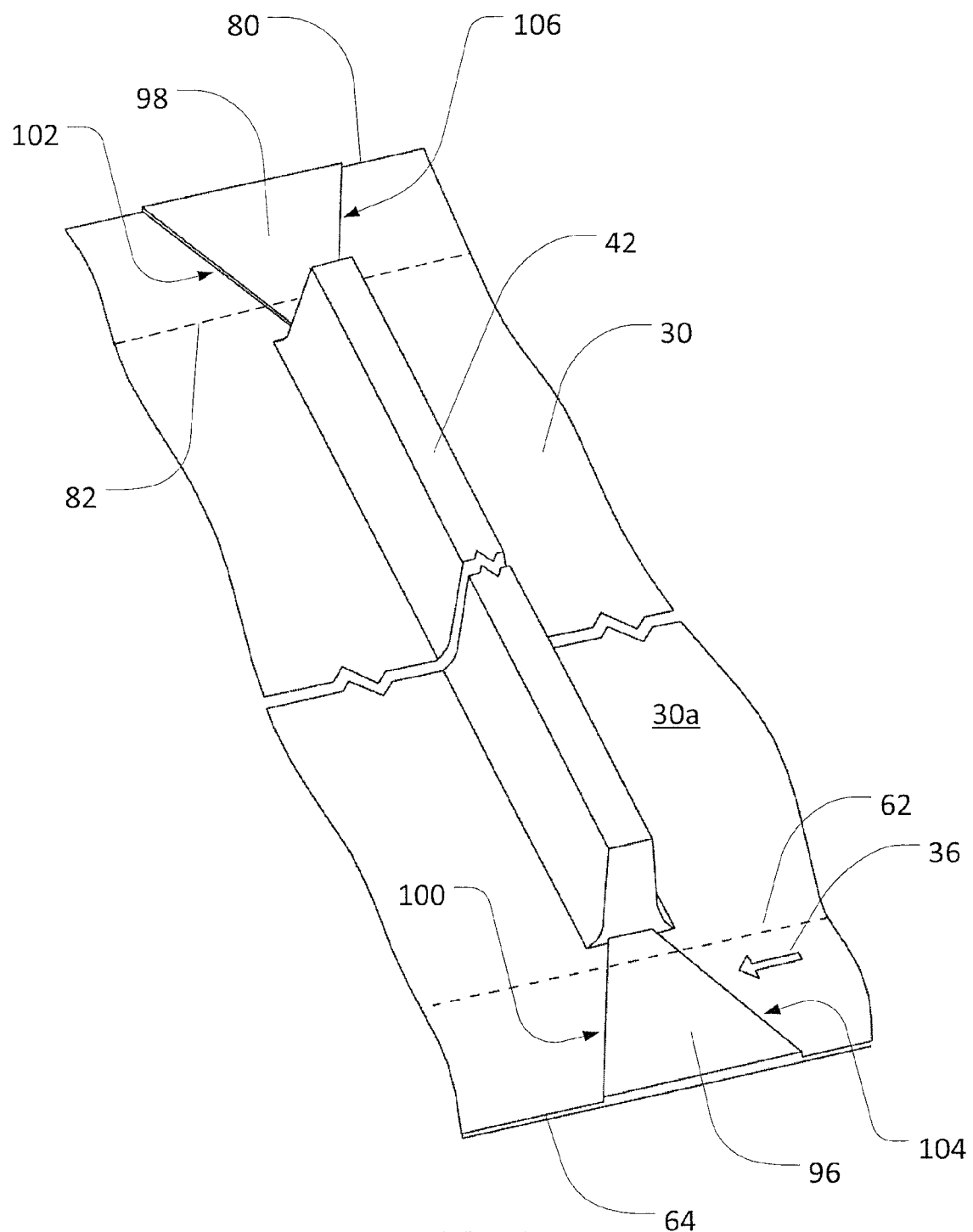
FIG. 4 is a perspective view of a two-sided cleaning arrangement for the endless belt of FIG. 1.

Referring also to FIG. 4, another example two-sided cleaning arrangement is depicted for the belt 30, with leading- and trailing-edge cleaning features 96 and 98, respectively. Generally, the cleaning features 96 and 98 may be formed in different patterns than the cleaning features 70 and 86 depicted in FIGS. 2A through 3B. As depicted, for example, each of the features 96 and 98 are configured as raised trapezoidal features, each with a forward facing surface 100 and 102 and a rearward facing surface 104 and 106 that are generally perpendicular to the crop-carrying surface 30a but angle away from the travel direction 36 for the belt 30. As depicted, the surfaces 100 and 106 are configured such that the cleaning feature 98 widens, with respect to the direction 36, from the leading to the trailing end of the feature 98. Likewise, the surfaces 100 and 104 are configured such that the cleaning feature 96 narrows, with respect to the direction 36, from the leading to the trailing end of the feature 96. This may result in improved engagement of crop material lodged within the gaps 66 and 84 (see FIGS. 2A through 3B) and improved conveyance of the crop material from out of the gaps 66 and 84. In other embodiments, other configurations may be used, including configurations with one or more of the surfaces 100 through 106 angling in an opposite direction from that depicted in FIG. 4. In some embodiments, the opposite surfaces 100 and 104 of the cleaning feature 96 and the opposite surfaces 102 and 106 of the cleaning feature 98 may meet at inner ends of the surfaces 100 through 106, such that the cleaning features 96 and 98 may exhibit triangular, rather than trapezoidal, patterns.

For clarity in FIG. 4, the crop ramp segments 52 and trailing cover 46 are not shown. However, the leading edge 82 of the trailing cover 46 and the trailing edge 62 of the crop ramp segments 52 are depicted as dotted lines. Accordingly, it can be seen that a trailing portion of the cleaning feature 96 extends in the trailing direction past the trailing edge 62 of the crop ramp segments 52. Similarly, it can be seen that a leading portion of the cleaning feature 98 extends in the leading direction past the leading edge 82 of the trailing cover 46. Also as depicted in FIG. 4, the cleaning features 96 and 98 extend from the leading and trailing edges 64 and 80 of the belt 30, respectively, to leading and trailing ends of the cleat 42, respectively. In other embodiments, other configurations may be possible, including configurations in which one or both of the cleaning features 96 and 98 are entirely covered by the crop ramp segments 52 or trailing cover 46, and configurations in which one or both of the cleaning features 96 and 98 do not extend into the gaps 66 or 84.

Figures 5A, 5B:
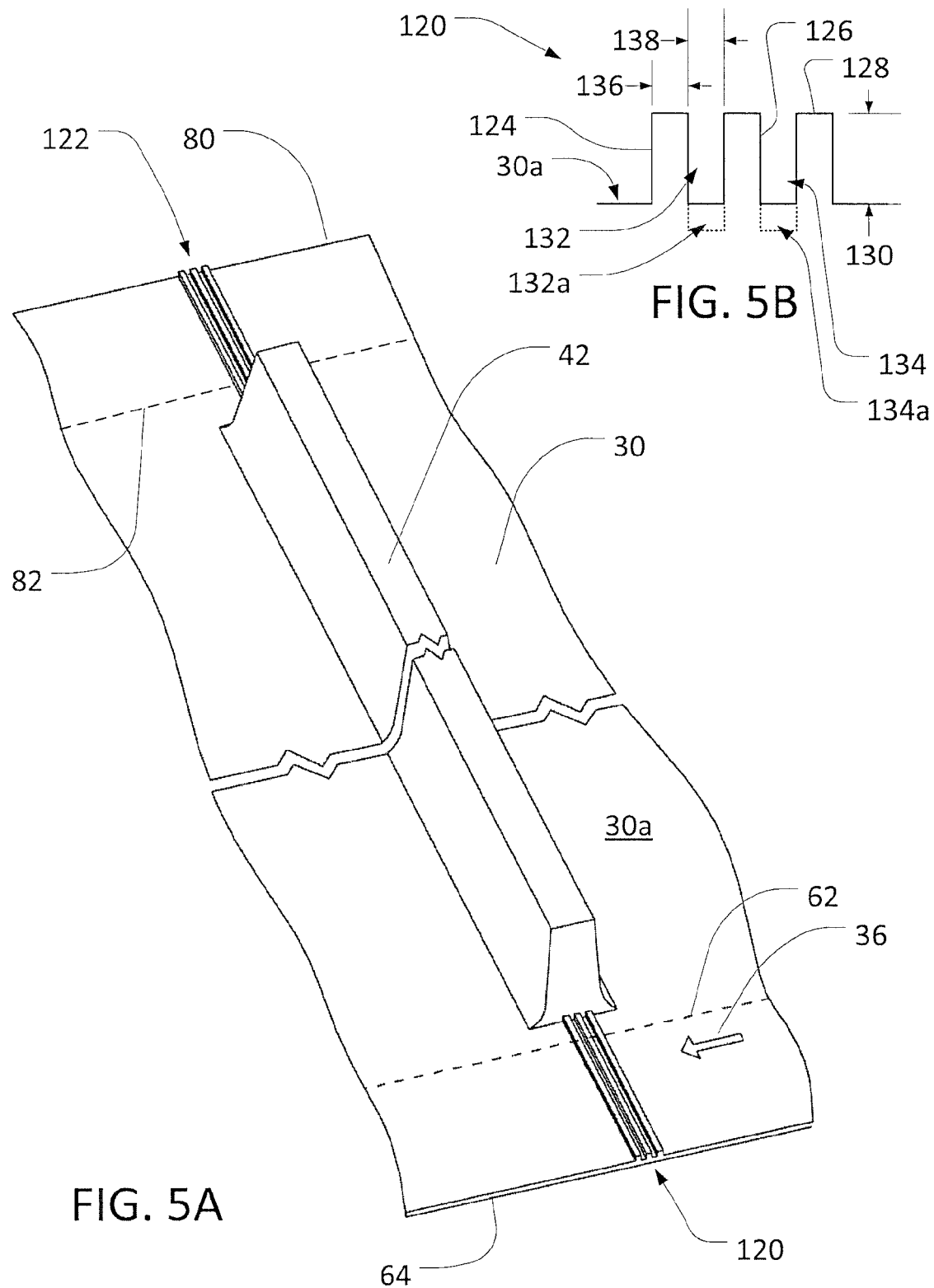
FIG. 5A is a perspective view of another two-sided cleaning arrangement for the endless belt of FIG. 1.
FIG. 5B is a schematic sectional view of cleaning features of the cleaning arrangement of FIG. 5A.

Referring also to FIG. 5A, another example two-sided cleaning arrangement is depicted for the belt 30, with leading- and trailing-edge cleaning feature arrays 120 and 122, respectively. Generally, each of the cleaning feature arrays 120 and 122 includes multiple cleaning features, including an series of alternating ridges and recesses. Referring also to FIG. 5B, for example, the cleaning feature array 120 includes three ridges 124, 126, and 128 extending a common maximum height 130 above the crop-carrying surface 30a and separated by recesses 132 and 134. As depicted, the ridges 124, 126, and 128 exhibit a common width 136 and generally planar top surfaces that are generally parallel with the crop-carrying surface 30a. Similarly, the recesses 132 and 134 exhibit a common width 138, which may be the same as the width 136, and generally planar bottom surfaces that are generally parallel with the crop-carrying surface 30a. In other configurations, other spacings and geometries may be used, as may different numbers of ridges or recesses. In some embodiments, the recesses 132 and 134 may extend below the crop-carrying surface 30a, as shown at the recess extensions 132a and 134a. In some embodiments, the heights of the various ridges 124, 126, and 128 and the depth of the various recesses 132 and 134 may vary from each other, such that certain ridges extend farther away from the crop-carrying surfaces than others and such that certain recesses exhibit greater depths than others.

For clarity in FIG. 5A, the crop ramp segments 52 and trailing cover 46 are not shown. However, the leading edge 82 of the trailing cover 46 and the trailing edge 62 of the crop ramp segments 52 are depicted as dotted lines. Accordingly, it can be seen that a trailing portion of the cleaning feature array 120 extends in the trailing direction past the trailing edge 62 of the crop ramp segments 52. Similarly, it can be seen that a leading portion of the cleaning feature array 122 extends in the leading direction past the leading edge 82 of the trailing cover 46. Also as depicted in FIG. 5A, the cleaning feature arrays 120 and 122 extend from the leading and trailing edges 64 and 80 of the belt 30, respectively, to leading and trailing ends of the cleat 42, respectively. In other embodiments, other configurations may be possible, including configurations in which one or both of the cleaning feature arrays 120 and 122 are entirely covered by the crop ramp segments 52 or trailing cover 46, and configurations in which one or both of the cleaning feature arrays 120 and 122 do not extend into the gaps 66 or 84 (see FIGS. 2A through 3B).

Figure 6:
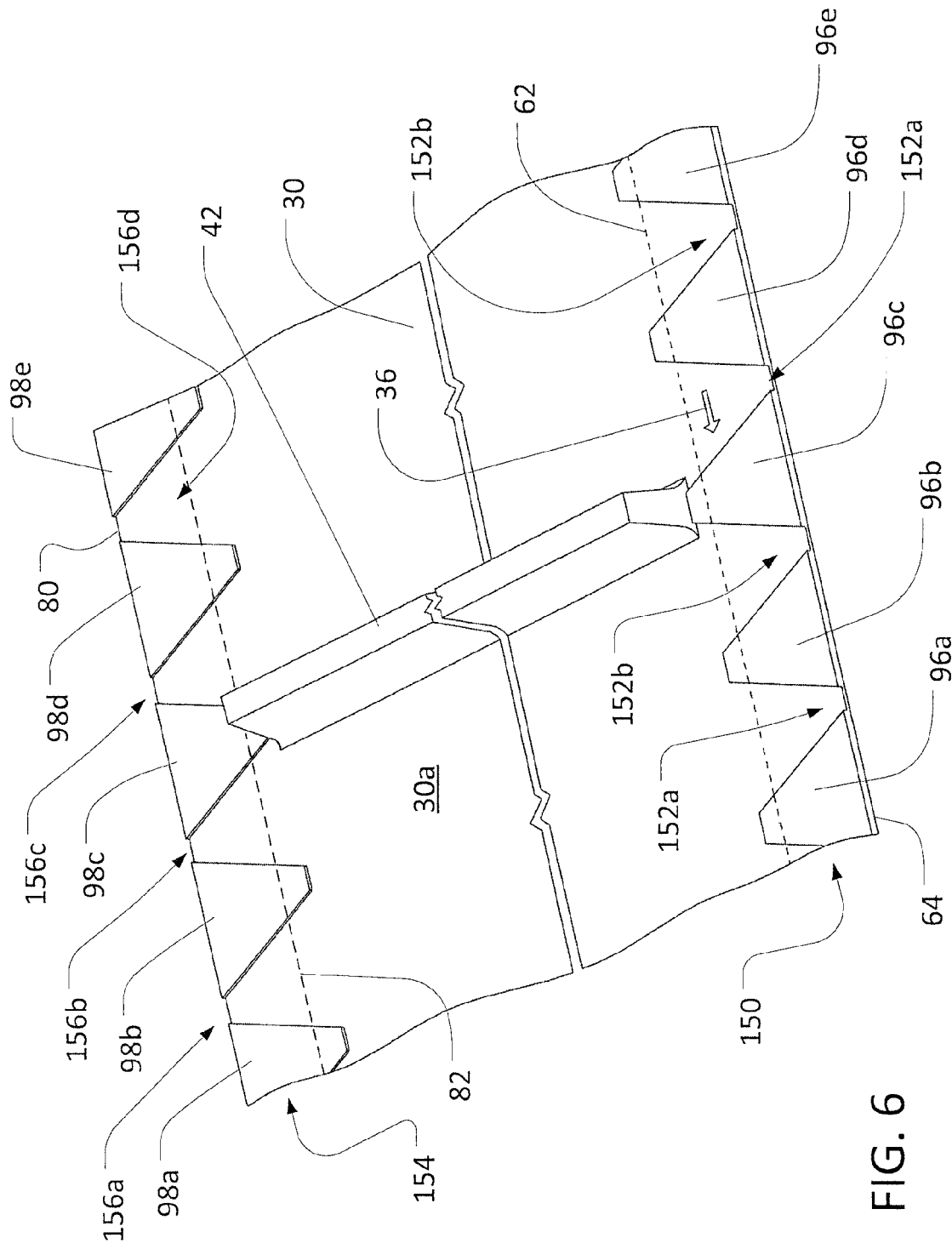
FIG. 6 is a perspective view of another two-sided cleaning arrangement for the endless belt of FIG. 1, with an array of cleaning features.

In some embodiments, arrays of cleaning features may extend over a substantial portion (e.g., 25% or more) of the circumferential length of the relevant belt. Referring also to FIG. 6, for example, instances of the features 96 and 98 (see FIG. 4) can be arranged in repeating arrays along the belt 30. For example, a leading-edge array 150 with cleaning features 96a though 96e (and others (not shown)) may extend along a leading region of the belt 30, including over 25% or more of the circumferential length of the belt 30. As depicted, relatively uniform gaps 152a through 152d are provided along the belt 30 between the various features 96a through 96e. In other embodiments, different sized gaps, non-uniform gaps, or no gaps, may be provided between the various features 96a through 96e.

Similarly, a trailing-edge array 154 with cleaning features 98a though 98e (and others (not shown)) may extend along a trailing region of the belt 30, including over 25% or more of the circumferential length of the belt 30. As depicted, relatively uniform gaps 156a through 156d are provided along the belt 30 between the various features 98a through 98e. In other embodiments, different sized gaps, non-uniform gaps, or no gaps, may be provided between the various features 98a through 98e.

As depicted in FIG. 6, the leading-edge array 150 and the trailing-edge array 154 are generally similar. Further, the narrower inner "peaks" of the various trapezoidal features 96 and 98 are generally aligned across the belt 30, as can be particularly seen for the features 96c and 98c that are adjacent to the cleat 42. In some embodiments, the leading-edge array 150 and the trailing-edge array 154 may be configured differently from each other. Likewise, in some embodiments, the various features 96 may be offset from corresponding features 98 (e.g., with inner "peaks" of the features 96 generally aligned with the various gaps 156).

Figure 7:
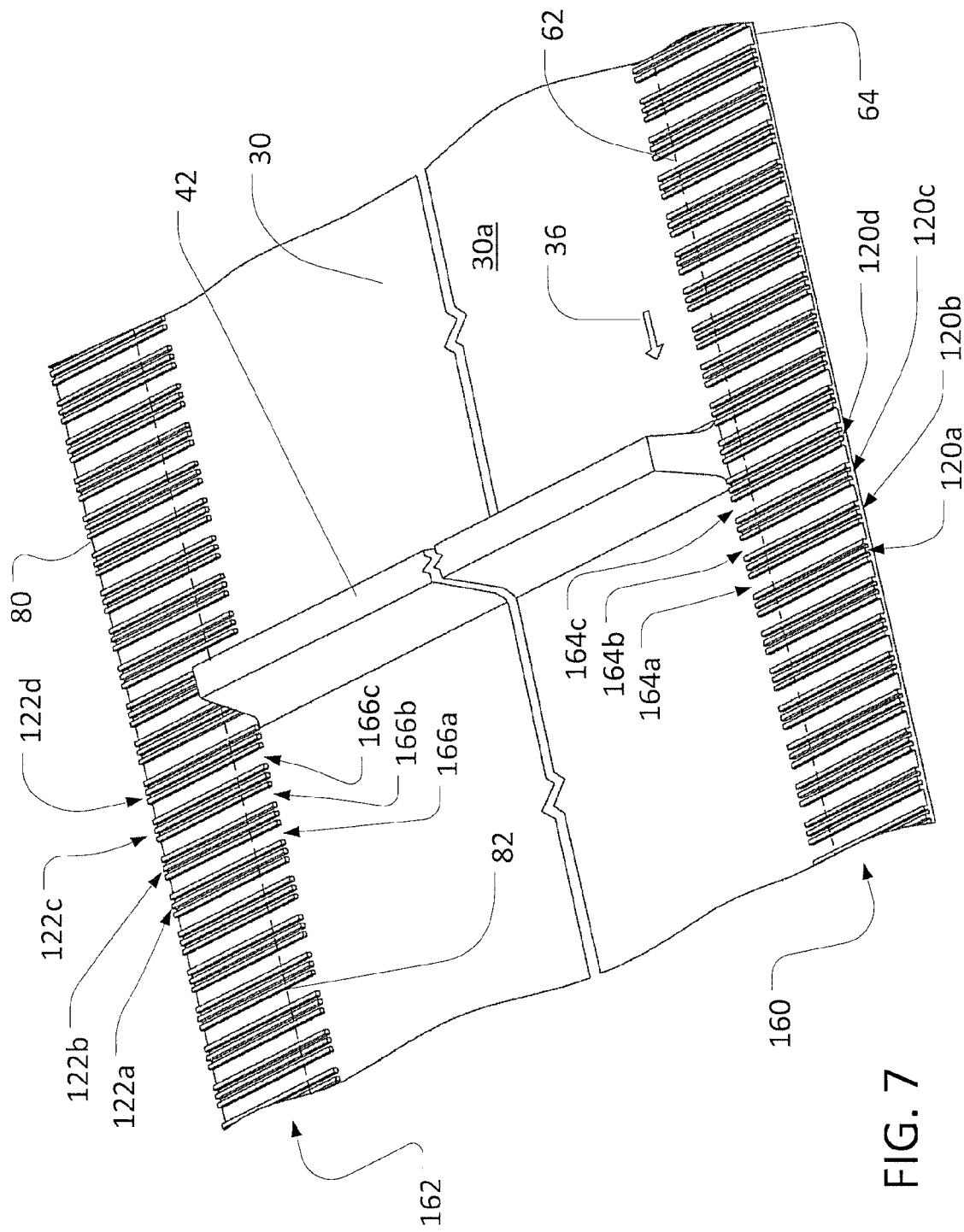
FIG. 7 is a perspective view of another two-sided cleaning arrangement for the endless belt of FIG. 1, with another array of cleaning features.

In some embodiments, a two-sided cleaning arrangement may include cleaning features configured as ridges and recesses arranged in arrays on opposite edges of the relevant belt. Referring also to FIG. 7, sets of ridges and recesses similar to the arrays 120 and 122 (see FIG. 5A) may be arranged in repeating arrays along leading and trailing edges 64 and 80 of the belt 30. In the embodiment depicted, a leading-edge array 160 extends along a leading region of the belt 30 (e.g., extending over 25% or more of the belt length), with various sets of ridges and recesses forming sub-arrays of the larger array 160 (e.g., as represented by the sub-arrays 120a through 120d). Likewise, a trailing-edge array 162 extends along a trailing region of the belt 30 (e.g., extending over 25% or more of the belt length), with various sets of ridges and recesses forming sub-arrays of the larger array 162 (e.g., as represented by the sub-arrays 122a through 122d). As depicted, relatively uniform gaps 164a through 164c and 166a through 166c are provided along the belt 30 between the various sub-arrays 120a through 120d and 122a through 122d, respectively. In other embodiments, different sized gaps, non-uniform gaps, or no gaps, may be provided between the various sub-arrays 120a through 120d and 122a through 122d (or between the ridges or other features of the sub-arrays 120a through 120d and 122a through 122d).

As depicted in FIG. 7, the leading-edge array 160 and the trailing-edge array 162 are generally similar. Further, the various sub-arrays 120a through 120d are generally aligned across the belt 30 with the various sub-arrays 122a through 122d, as can be particularly seen for the sub-arrays 120d and 122d that are adjacent to the cleat 42. In some embodiments, the leading-edge array 160 and the trailing-edge array 162 may be configured differently from each other. Likewise, in some embodiments, the various sub-arrays 120a through 120d may be offset from corresponding sub-arrays 122a through 122d (e.g., with the sub-array 120a generally aligned with one of the various gaps 166).

Figure 8:
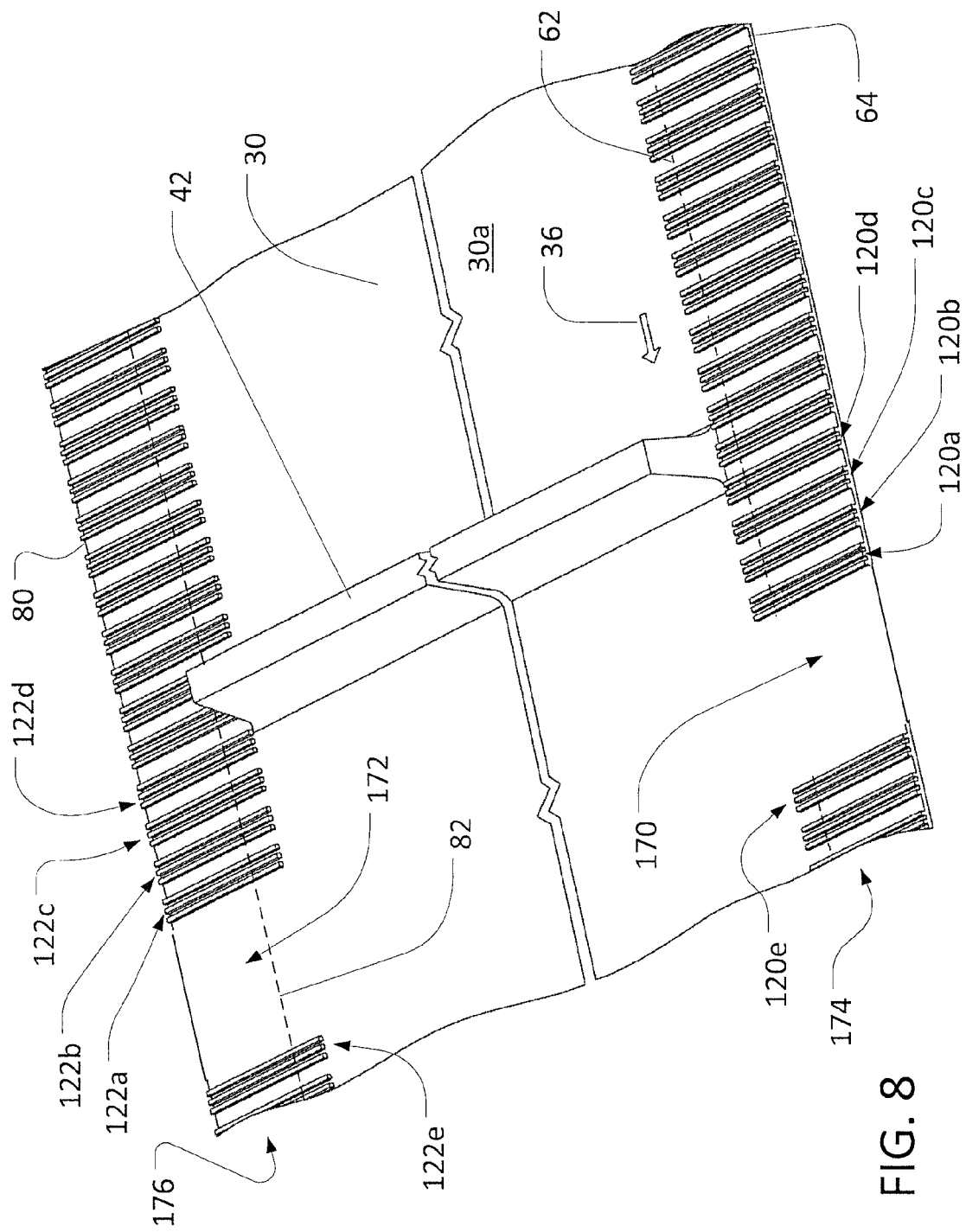
FIG. 8 is a perspective view of another two-sided cleaning arrangement for the endless belt of FIG. 1, with another array of cleaning features.

In some embodiments, one or more flattened regions may separate various sub-arrays of an array of cleaning features on a belt. For example, referring to FIG. 8, flattened regions 170 and 172 in leading-edge array 174 and trailing-edge array 176, respectively, may be formed from separating sets (i.e., sub-arrays) of ridges and recesses along the belt 30. As depicted, the flattened regions 170 and 172 separate sub-array 120a from sub-array 120e and separate sub-array 122a from sub-array 122e, respectively. In other embodiments, other configurations may be possible. In some embodiments, the flattened regions 170 and 172 may be relatively wide, with respect to the associated cleaning features. For example, a width of the regions 170 and 172 along the direction 36 may be generally larger than the width 136 or the width 138 (see FIG. 5B) of the ridges or recesses of the various sub-arrays (e.g., the sub-arrays 120a and 122a). Likewise, in some embodiments, the width of the regions 170 and 172 may be generally larger than the width of an entire one or more entire sub-arrays (e.g., the sub-arrays 120a and 122a). The various flattened regions may extend above the crop-carrying surface 30a, be recessed below the crop-carrying surface 30a, or be flush with the crop-carrying surface 30a.

Figure 9:
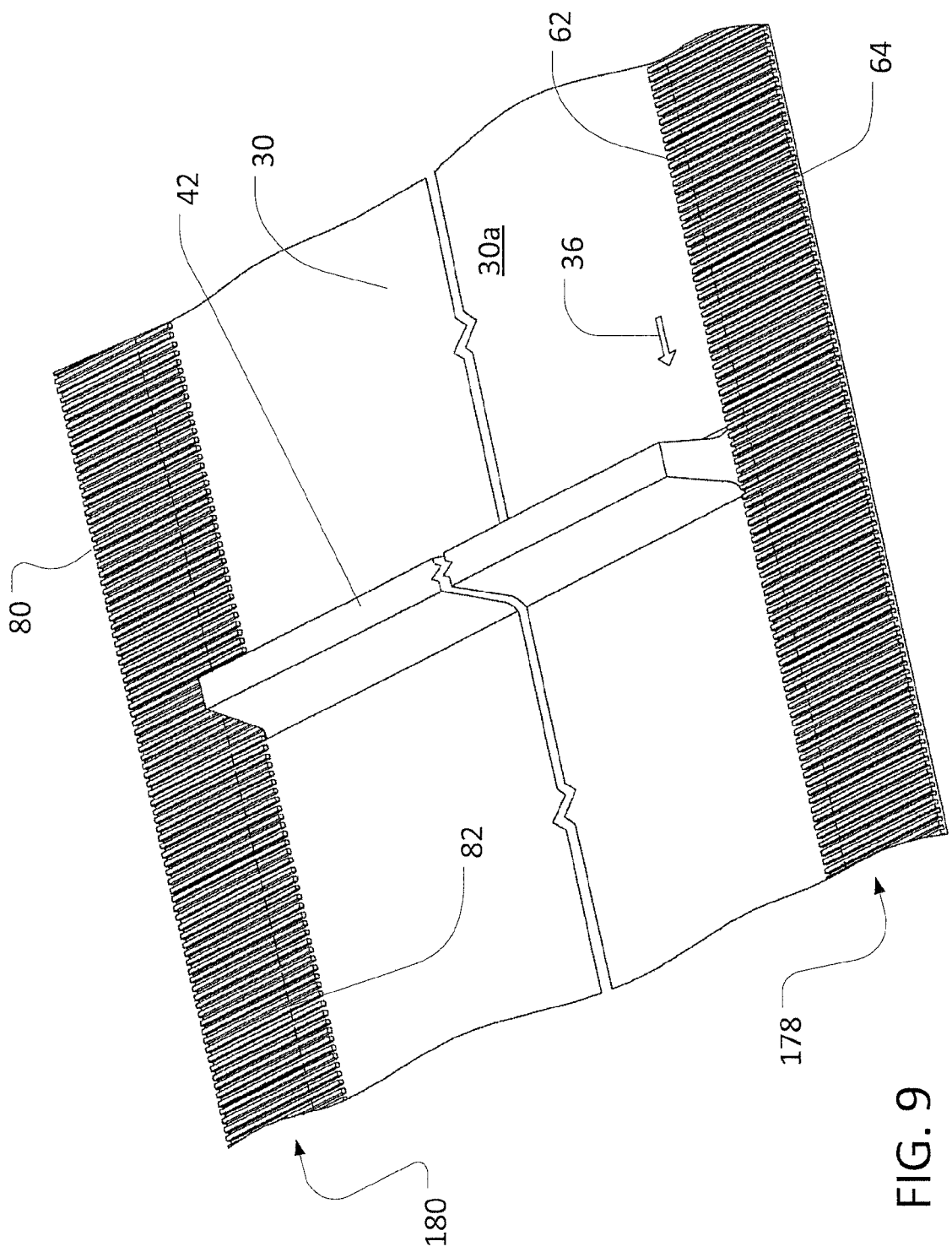
FIG. 9 is a perspective view of another two-sided cleaning arrangement for the endless belt of FIG. 1, with another array of cleaning features.

In other embodiments, other configurations may be possible. Referring to FIG. 9, for example, various ridges and recesses similar to the ridges and recesses of cleaning feature arrays 120 and 122 may be arranged in cleaning feature arrays 178 and 180 that extend over the entire belt circumferential length, with no gaps along the direction 36 other than from the recesses of the arrays 178 and 180 (e.g., recesses similar to the recesses 132 and 134 of FIG. 5B).

Figure 10:
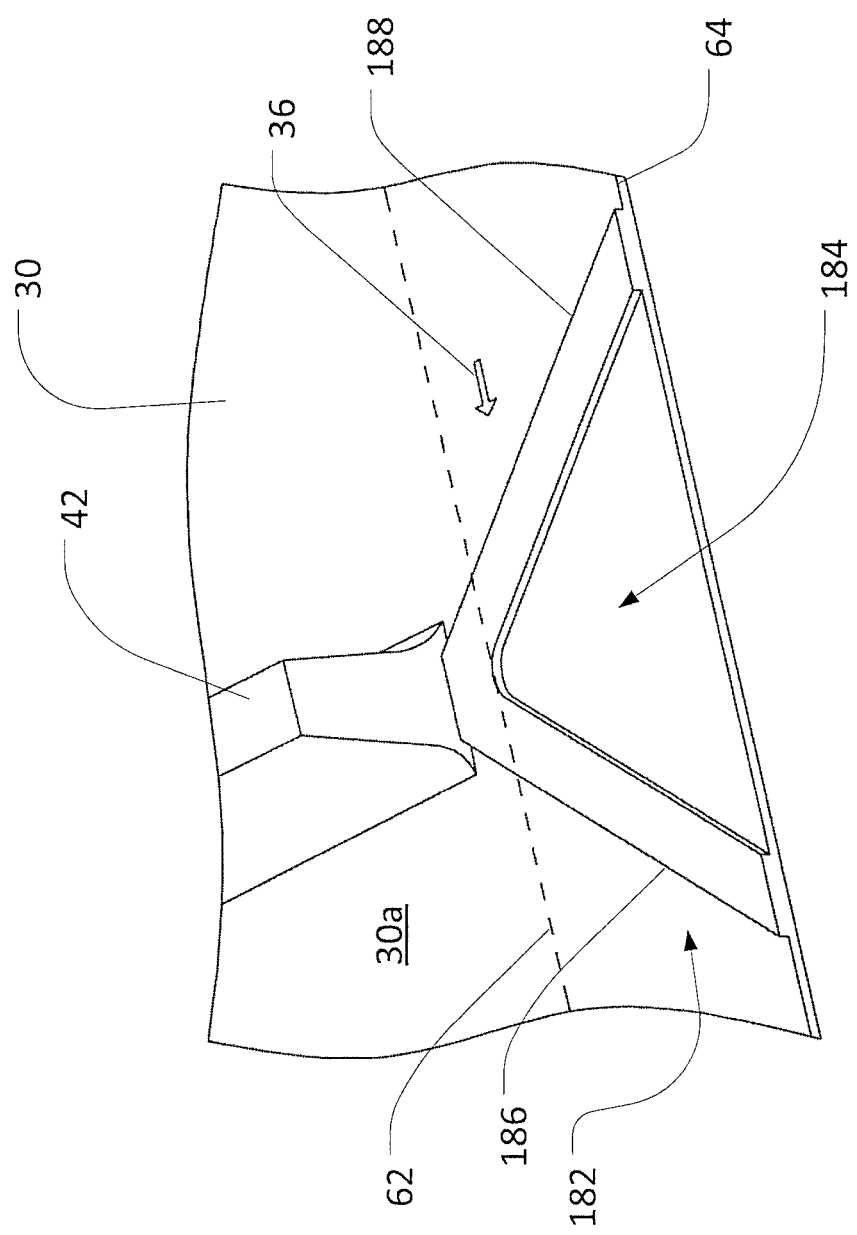
FIG. 10 is a perspective view of a third cleaning feature for use in a two-sided cleaning arrangement.

As also noted above, in some embodiments, cleaning features for the belt may exhibit still other patterns. Referring to FIG. 10, for example, still another example cleaning feature for the belt 30 is shown, configured as a chevron-shaped cleaning feature 182. Generally, the cleaning feature 182 may be configured similarly to one of the trapezoidal features 98 (see FIG. 6), but with an open region 184 between forward and rearward angled arms 186 and 188. The view of FIG. 10 does not include a trailing-edge region of the belt 30. It will be understood, however, that cleaning features similar to the cleaning feature 182 (or others) may be used as trailing-edge cleaning features for the belt 30. Likewise, it will be understood that the cleaning feature 182 may be included in cleaning feature arrays (not shown in FIG. 10), such as in repeating arrays of multiple cleaning features that are patterned similarly to the cleaning feature 182. In some embodiments, the opposite arms 186 and 188 of the cleaning feature 182 may intersect at inner ends of the arms 186 and 188, such that the cleaning feature 182 may exhibit a triangular chevron pattern, rather than a trapezoidal chevron pattern.

Figure 11A:
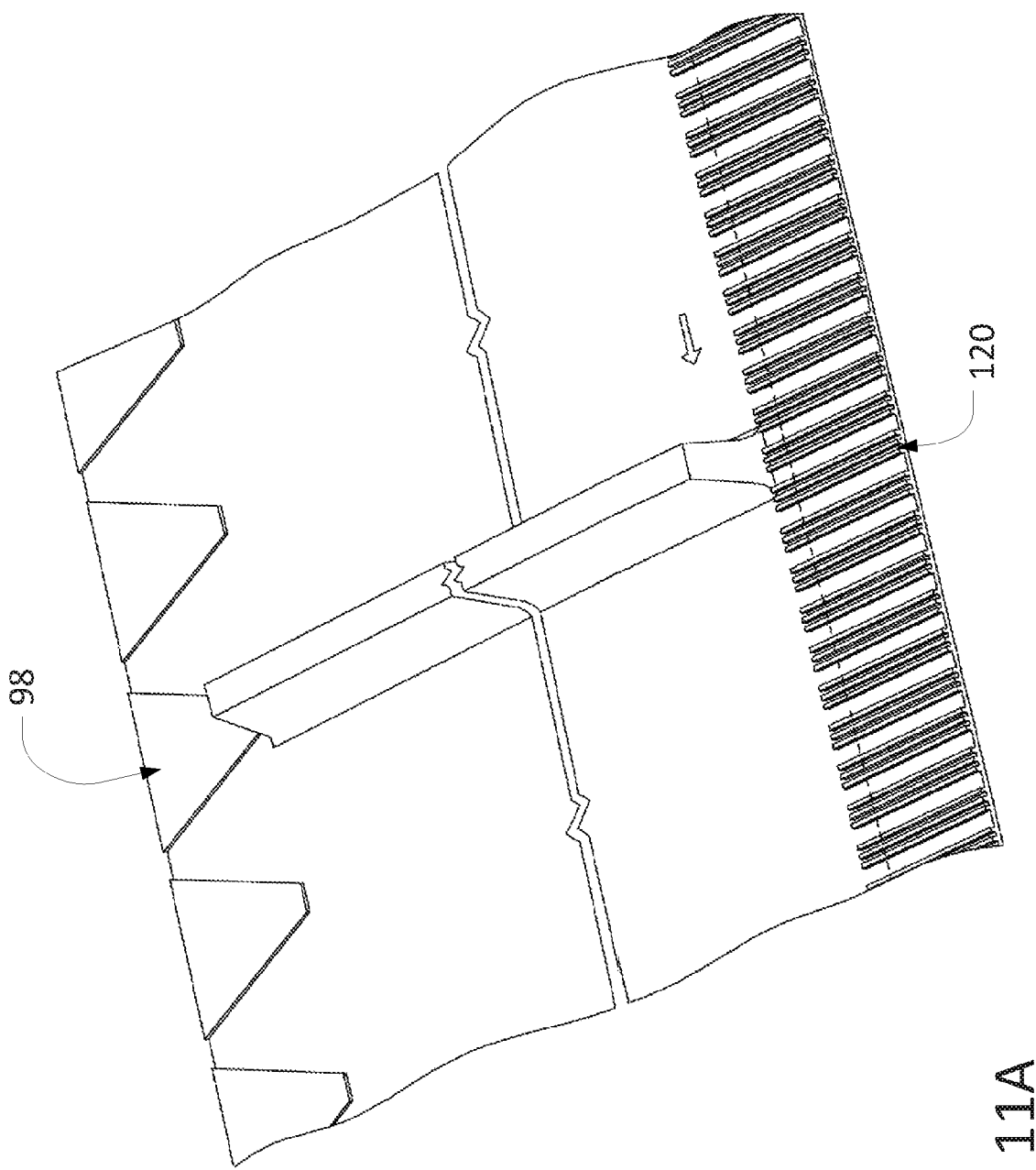
FIGS. 11A-11C illustrate various alternative endless belt arrangements according to this disclosure.
Figure 11B:
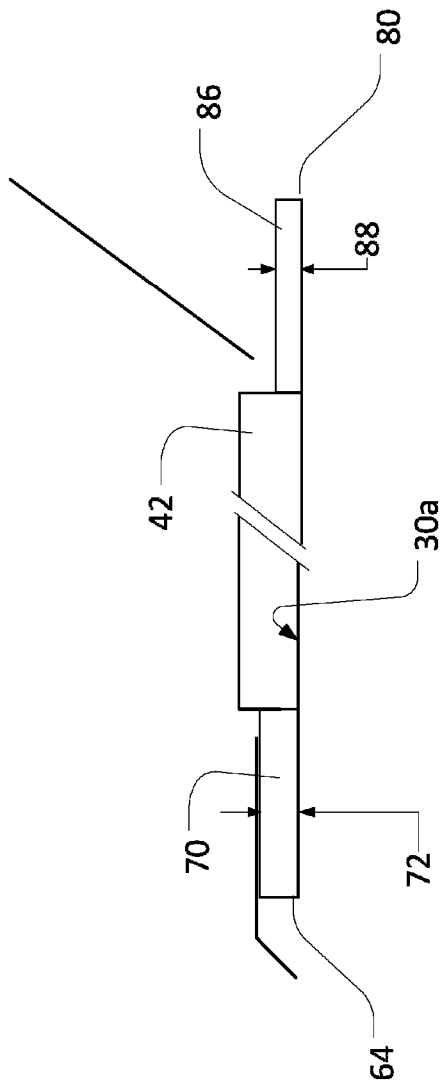
Figure 11C:
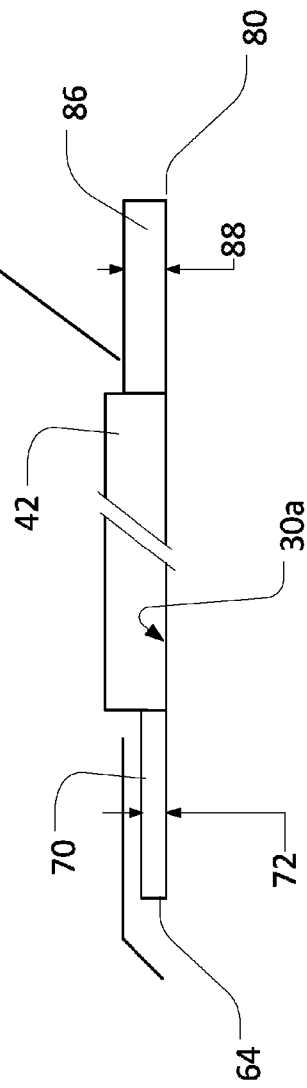

Various examples of cleaning features and cleaning feature arrays are presented above. It will be understood that various combinations of these and other features and arrays may be used for a given belt in order to provide a two-sided cleaning arrangement. In some embodiments, similar patterns of features or types of arrays may be used at leading and trailing regions. In some embodiments, different patterns of features or types of arrays may be used alternately (or in other combination) along a particular leading or trailing region of a belt. For example, in some features or arrays, features similar to the trapezoidal features 98 may be combined with ridges and recesses such as in the arrays 120. In some embodiments, different patterns of features or types of arrays may be used at a leading region than are used at a trailing region. For example, as shown in FIG. 11A, features similar to the trapezoidal features 98 may be used along a trailing region and features similar to the ridges and recesses in the arrays 120 may be used along a leading region. Likewise, the dimensions (or other geometry) of leading region cleaning features (e.g., heights above the relevant crop-carrying surface) may be configured differently than the dimensions (or other geometry) of trailing region cleaning features, such as shown in FIGS. 11B and 11C.

In some embodiments, the relevant belt (e.g., the belt 30) may be configured to be reversible, such that the belt may be installed on a header (e.g., the header 20) with either edge of the belt serving as the leading (or trailing) edge. Where, for example, the leading edge features suffers from greater wear than the trailing edge features, reversal of the belt may allow for continued cleaning at the leading edge even after the originally leading edge features have become worn. As another potential benefit, variation between leading and trailing cleaning features may sometimes allow an operator to reverse a belt in order to customize cleaning functionality for a particular harvesting operation. For example, a belt with more aggressive cleaning features at a first edge (e.g., features with relatively large heights above the crop-carrying surface or relatively aggressively angled forward features) and less aggressive cleaning features at a second edge (e.g., features with relatively small heights above the crop-carrying surface or less aggressively angled forward features) can be arranged on a conveyor with the first edge of the belt as the leading edge or as the trailing edge, depending on whether more or less aggressive cleaning is desired at the leading edge.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An endless belt (30) for use with an agricultural draper header (20) with a crop ramp (52) that is separated from a trailing cover (46) by a first width, the endless belt comprising:
    a crop-carrying surface (30a) extending at least partly over the first width;
    a first cleaning region; and
    a second cleaning region at least partly separated from the first cleaning region by the crop-carrying surface;
    wherein the first cleaning region at least partly includes a first cleaning feature (70, 96) and at least part of the first cleaning feature extends above the crop-carrying surface to clean crop material from the below the crop ramp; and
    wherein the second cleaning region at least partly includes a second cleaning feature (86, 98) and at least part of the second cleaning feature is recessed below the crop-carrying surface to clean crop material from below the trailing cover.

2. The endless belt of claim 1, wherein at least one of the first and second cleaning features includes ridges (124, 126, 128) extending above the crop-carrying surface and recesses (132, 134) interspersed with the ridges.

3. The endless belt of claim 1, wherein one or more of a first array (150, 160, 174, 178) of cleaning features and a second array (154, 162, 176, 180) of cleaning features extends over at least 25% of a circumferential length of the endless belt, the first and second cleaning feature arrays including, respectively, the first and second cleaning features.

4. The endless belt of claim 3, wherein the one or more of the first and second cleaning features includes ridges (124, 126, 128) extending above the crop-carrying surface and recesses (132, 134) interspersed with the ridges.

5. The endless belt of claim 1, wherein a maximum extension (72) of the first cleaning feature above the crop-carrying surface is smaller than a minimum clearance (66a) between a trailing edge (62b) of the crop ramp and the crop-carrying surface.

6. The endless belt of claim 5, wherein the maximum extension (88) of the second cleaning feature above the crop-carrying surface is smaller than a minimum clearance (84a) between a leading edge (82) of the trailing cover and the crop-carrying surface.

7. The endless belt of claim 1, wherein a respective maximum extension of each of the first and second cleaning features (72, 88) is smaller than a minimum clearance (66a) between a trailing edge (63b) of the crop ramp and the crop-carrying surface and smaller than a minimum clearance (84a) between a leading edge (82) of the trailing cover and the crop-carrying surface.

8. The endless belt of claim 1, wherein the first cleaning feature exhibits a first pattern (86) and the second cleaning feature exhibits a second pattern (98, 182) different from the first pattern.

9. An endless belt (30) for use with an agricultural draper header (20) with a crop ramp (52) that is separated from a trailing cover (46) by a first width, the endless belt comprising:
    a crop-carrying surface (30a) extending at least partly over the first width;
    a first cleaning region; and
    a second cleaning region at least partly separated from the first cleaning region by the crop-carrying surface;
    wherein the first cleaning region at least partly includes a first array (160, 174, 178) of first cleaning features, the first array including a first plurality of alternating ridges and recesses (124, 126, 128, 132, 134) in which the plurality of ridges extends above the crop-carrying surface to clean crop material from the below the crop ramp; and
    wherein the second cleaning region at least partly includes a second array (162, 176, 180) of second cleaning features, the second array including a second plurality of alternating ridges and recesses (124, 126, 128, 132, 134) in which the plurality of recesses extends below the crop-carrying surface to clean crop material from below the trailing cover.

10. The endless belt of claim 9, wherein each of the first and second arrays extends over at least 25% of a circumferential length of the endless belt.

11. The endless belt of claim 10, wherein the first and second arrays include respective first and second pluralities of sub-arrays (120a-d, 122a-d), the first and second sub-arrays including respective first and second pluralities of alternating ridges and recesses having one or more respective first and second ridge and recess widths;
    wherein at least first and second sub-arrays of the first plurality of sub-arrays are separated from each other by a first flattened region (170) of the first cleaning region, the first flattened region extending over a first width that is larger than at least one of the one or more first ridge widths and the one or more first recess widths; and
    wherein at least third and fourth sub-arrays of the second plurality of sub-arrays are separated from each other by a second flattened region (172) of the second cleaning region, the second flattened region extending over a second width that is larger than at least one of the one or more second ridge widths and the one or more second recess widths.

12. An endless belt (30) for conveying crop material on an agricultural draper header (20), the endless belt comprising:
    a crop-carrying surface (30a);
    a first cleaning feature (70, 96) disposed in a first edge region of the endless belt, at least part of the first cleaning feature extending above the crop-carrying surface to clean crop material from the below the crop ramp; and
    a second cleaning feature (86, 98) disposed in a second edge region of the endless belt that is at least partly separated from the first edge region of the endless belt by the crop-carrying surface, at least part of the second cleaning feature being recessed below the crop-carrying surface to clean crop material from below the trailing cover.

13. The endless belt of claim 12, wherein at least one of the first and second cleaning features includes ridges (124, 126, 128) extending above the crop-carrying surface and recesses (132, 134) interspersed with the ridges.

14. The endless belt of claim 13, wherein one or more of the recesses extend below the crop-carrying surface.

15. The endless belt of claim 12, wherein one or more of a first array (150, 160, 174, 178) of cleaning feature and a second array (154, 162, 176, 180) of cleaning features extends over at least 25% of a circumferential length of the endless belt, the first and second cleaning feature arrays including, respectively, the first and second cleaning features.

16. The endless belt of claim 15, wherein each of the first and second cleaning feature arrays extend over at least 25% of the circumferential length of the endless belt.

17. The endless belt of claim 15, wherein the one or more of the first and second cleaning feature arrays includes ridges (124, 126, 128) extending above the crop-carrying surface and recesses (132, 134) interspersed with the ridges.

18. The endless belt of claim 12, wherein a maximum extension (72) of the first cleaning feature above the crop-carrying surface is smaller than a maximum extension (88) of the second cleaning feature above the crop-carrying surface.

19. The endless belt of claim 12, wherein a maximum extension (72) of the first cleaning feature above the crop-carrying surface is larger than a maximum extension (88) of the second cleaning feature above the crop-carrying surface.

20. The endless belt of claim 12, wherein the first cleaning feature exhibits a first pattern (70) and the second cleaning feature exhibits a second pattern (98, 182) different from the first pattern.

\* \* \* \* \*